United States Patent [19]
Kennedy

[11] 3,717,360
[45] Feb. 20, 1973

[54] PLURAL OCCUPANT PROPELLED VELOCIPEDE

[76] Inventor: Damon M. Kennedy, 4410 W. Hiawatha Street, Tampa, Fla. 33614

[22] Filed: Nov. 24, 1970

[21] Appl. No.: 92,423

[52] U.S. Cl. ................... 280/231, 280/259, 280/282
[51] Int. Cl. ............................................... B62k 5/00
[58] Field of Search......280/282, 231, 239, 273, 204, 280/216; D34/15; 280/259, 263

[56] References Cited
UNITED STATES PATENTS

| D176,584 | 1/1956 | Barone et al. | D34/15 |
|---|---|---|---|
| 598,872 | 2/1898 | Hunt | 280/7.16 |
| 595,490 | 12/1897 | Montgomery | 280/239 |
| 1,380,893 | 6/1921 | Gebert | 280/222 |

Primary Examiner—Kenneth H. Betts
Attorney—Stein and Orman

[57] ABSTRACT

This invention is a sidewalk riding toy. It is operated by two riders and creates a unique action, while in operation, by pedalling and steering from both the front and the back.

4 Claims, 3 Drawing Figures

PLURAL OCCUPANT PROPELLED VELOCIPEDE

SUMMARY OF THE DISCLOSURE

This discovery is a toy, a double tricycle that is operated by two riders at one time. The vehicle is composed of a common straight body with two standard tricycle drive wheels attached to it. The vehicle is supported between the two drive wheels by support legs and an axle with two casters attached to it. Both drive wheels independently drive and steer the vehicle. The casters that support the vehicle allow it to go in any direction that either rider directs it. This makes complete control by either rider impossible, sometimes causing the vehicle to swing back and forth as it is operated.

The steering by each rider pivots on the steering wheel of the other, causing unsure steering, thus creating the unique action of this toy.

REFERENCE TO DRAWING:

The accompanying patent drawing has three figures, described as follows:
 FIG. 1 is the top, or plan view of the vehicle.
 FIG. 2 shows the vehicle in side elevation.
 FIG. 3 is a dimensional drawing of the vehicle.

DETAILED DESCRIPTION:

Figure 1:
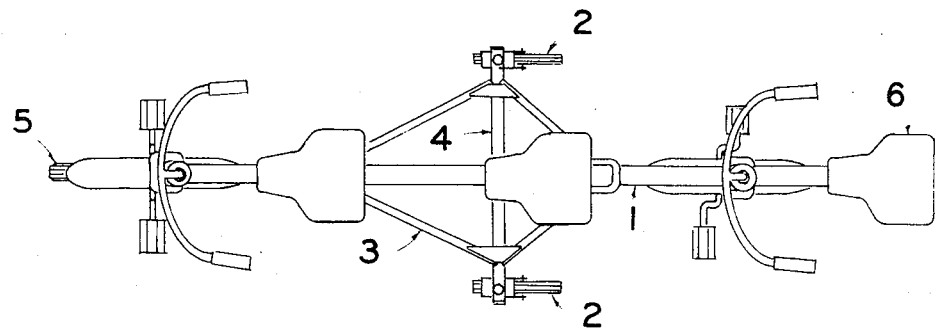
Figure 2:
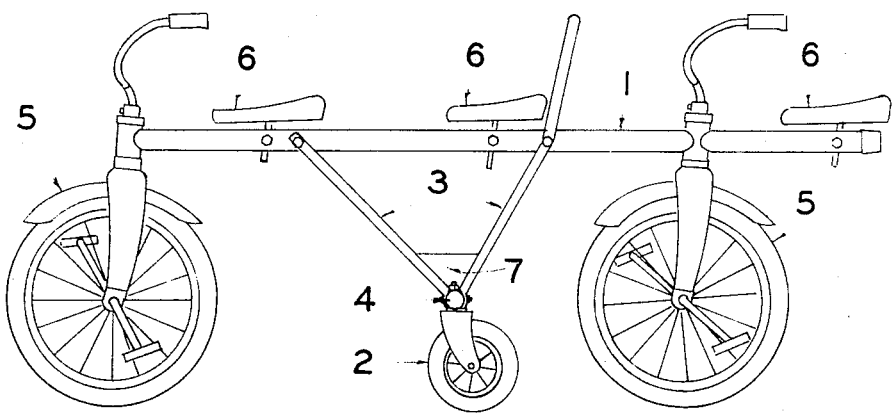
Figure 3:
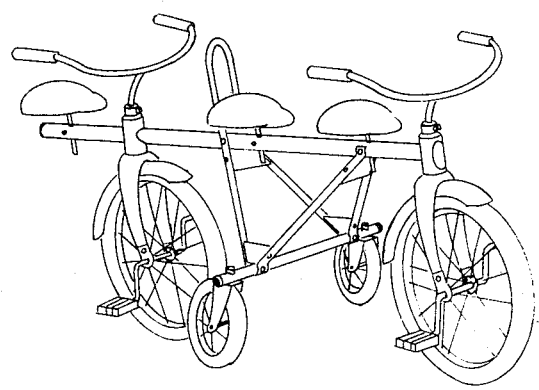

This invention, basically, is a riding toy designed for operation by two children, although it can be operated by one and can carry three. This is a sidewalk toy or vehicle that is driven from the front and from the back by means of two standard tricycle pedal wheels 5. Both drive wheels 5 are attached to a single straight frame 1 that is supported between the pedal wheels 5 by bracing to casters or swivel wheels 2 at ground level. The two independent drive and steering wheels 5, along with the supporting casters 2, allow for a unique action when this toy is operated.

The two drive wheels 5 are attached to the main body 1 pipe, or tube, in the same manner as a standard tricycle is constructed. The front wheel 5 is attached directly to the front of the body 1 pipe and the rear wheel 5 is attached approximately 12" from the end of the body pipe. Both drive wheels 5 are vertically in line with each other. The vehicle is supported between the drive wheels 5 by the support legs 3. There are two pairs of support legs 3; the first pair 3 (one on each side of the body pipe) is attached under the front seat 6, and the rear pair 3 is attached about 6" in front of the rear drive wheel 5. The legs 3 extend down and out and attach to the axle 4. Triangular shaped braces are required where the support legs 3 attach to the body 1 pipe and to the axle 4. These are the main points of stress on the vehicle and need reinforcement. Attached to the axle 4 are two swivel caster wheels 2, 4 or 5 inches in diameter. (There are several ways to support the vehicle by the caster wheels 2, but regardless of the method used, the action or end result will be the same as long as these caster wheels 2 give vertical support to the vehicle.) These casters 2 allow the vehicle to move in any direction the two drivers simultaneously steer it. The elevation of the two pedal wheels 5 and the two caster 2 wheels should be as close as possible for level operation. Shims (not shown) can be placed between the axle 4 and casters 2 for leveling if necessary.

The specific invention, that a patent is sought for, is the toy itself because of the new and different action it creates. To best explain this action, let us imagine two children riding the vehicle down a sidewalk. When one or other of the riders turns in any direction, automatically the direction the other rider is going is changed because both riders are sitting on the same vehicle frame. The other rider turns to adjust direction, and the whole vehicle responds to both riders' change of direction at once. The supporting casters allow the vehicle to follow in any direction that either rider steers. The turn by the front rider is pivoted on the drive and steer wheel of the rear rider and vice versa. This can cause the vehicle to swing back and forth as the riders both try to adjust their direction. This element of not being completely sure in which direction the vehicle will go, or how fast it will go there, makes for most of the fun of this toy.

I claim:
1. A vehicle having a longitudinally extending main frame, said frame having at least two longitudinally spaced apart attaching means, a fork and handle bar assembly swivelly mounted in each of said attaching means, a pedal-driven wheel mounted in each of said forks, each of said pedal-driven wheel steerable independent of one another, seats attached to said frame adjacent said handle bar assemblies for riders wherein the direction of travel of said vehicle is determined by the position of each of said pedal-driven wheel relative to each other and relative to said frame whereby steering control by either rider is dependent on the other rider.

2. The vehicle of claim 1 further including a support means attached to said frame between said pedal-driven wheels.

3. The vehicle of claim 2 wherein said support means comprises a support member and a plurality of casters, said support member interconnecting said frame and said casters such that said frame is supported above the supporting surface by said casters.

4. The vehicle of claim 3 wherein said casters are swivelly attached to said support member whereby said casters follow the direction of said vehicle controlled by said pedal-driven wheels.

* * * * *